(12) United States Patent
Yamamoto

(10) Patent No.: US 8,246,122 B2
(45) Date of Patent: Aug. 21, 2012

(54) BRAKE CONTROL SYSTEM AND BRAKE CONTROL METHOD

(75) Inventor: Takayuki Yamamoto, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 317 days.

(21) Appl. No.: 12/672,161

(22) PCT Filed: Aug. 8, 2008

(86) PCT No.: PCT/IB2008/002087
§ 371 (c)(1),
(2), (4) Date: Feb. 4, 2010

(87) PCT Pub. No.: WO2009/022209
PCT Pub. Date: Feb. 19, 2009

(65) Prior Publication Data
US 2012/0038209 A1    Feb. 16, 2012

(30) Foreign Application Priority Data
Aug. 10, 2007 (JP) .................. 2007-210143

(51) Int. Cl.
*B60T 13/14* (2006.01)
(52) U.S. Cl. ............... 303/122.03; 303/122.1
(58) Field of Classification Search ......... 303/122.03, 303/122.09, 122.1, 122.13, 122.14; 60/562, 60/585, 588
See application file for complete search history.

(56) References Cited

U.S. PATENT DOCUMENTS

| | | | | |
|---|---|---|---|---|
| 5,826,953 | A | * | 10/1998 | Heubner ............... 303/122.13 |
| 6,953,229 | B2 | * | 10/2005 | Isono et al. ............ 303/114.1 |
| 7,309,112 | B2 | * | 12/2007 | Isono ............................. 303/11 |

FOREIGN PATENT DOCUMENTS

| | | |
|---|---|---|
| DE | 33 28 534 A1 | 2/1985 |
| DE | 34 30 096 A1 | 2/1986 |
| DE | 37 16 135 A1 | 11/1988 |
| DE | 196 18 489 | 3/1997 |
| DE | 101 02 594 A1 | 7/2002 |
| GB | 2 121 130 | 12/1983 |
| JP | 61 57456 | 3/1986 |
| JP | 62 214263 | 9/1987 |
| JP | 2 231260 | 9/1990 |
| JP | 3009621 | 1/1995 |
| JP | 7 35228 | 6/1995 |
| JP | 2000 272497 | 10/2000 |
| JP | 2004 322843 | 11/2004 |

OTHER PUBLICATIONS

Office Action issued Oct. 17, 2011 in German Patent Application No. 11 2008 002 155.4 (with English translation).

* cited by examiner

*Primary Examiner* — Christopher Schwartz
(74) *Attorney, Agent, or Firm* — Oblon, Spivak, McClelland, Maier & Neustadt, L.L.P.

(57) ABSTRACT

A fluid level detecting apparatus detects the level of fluid in a reservoir. When the fluid level detecting apparatus detects that the fluid level has reached a minimum fluid level, an ECU issues a warning. If, after the warning has been issued, the fluid level detecting apparatus detects that the fluid level has reached a failsafe mode operation fluid level, which is lower than the minimum fluid level, the switches a normal control mode to a failsafe mode, and performs brake control using the failsafe mode.

9 Claims, 7 Drawing Sheets

BRAKE CONTROL SYSTEM AND BRAKE CONTROL METHOD

BACKGROUND OF THE INVENTION

1. Field of the Invention

The invention relates to a brake control system and a brake control method which controls the braking force applied to a wheel of a vehicle.

2. Description of the Related Art

Japanese Patent Application Publication No. 2004-322843 (JP-A-2004-322843), for example, describes one electronically controlled brake system that controls the braking force to each wheel in such a manner as to apply the optimal braking force for the running state of the vehicle to the vehicle. This electronically controlled brake system monitors the wheel cylinder pressure in each wheel using pressure sensors, and controls an electromagnetic flowrate control valve such that the wheel cylinder pressure matches a target pressure calculated based on a brake pedal operation amount by a driver.

Incidentally, Japanese Utility Model Application Publication No. 7-35228 (JP-U-7-35228) and Japanese Patent Application Publication No. 2000-272497 (JP-A-2000-272497) describe electronically controlled brake systems that have a fluid level detecting apparatus that detects when the level of fluid in a reservoir has become lower than a preset fluid level. When this fluid level detecting apparatus detects that the fluid level has become lower than the set fluid level, it is determined that there is a fluid leak and a warning is issued to the driver and the wheel cylinder pressure control mode is changed.

In this electronically controlled brake system, it is necessary to ensure that the reservoir has a capacity large enough to enable the fluid level detecting apparatus to operate. If the reservoir capacity is too small, there may not be enough fluid for the fluid level detecting apparatus to operate due to variations in the amount of fluid filled when the vehicle is shipped from the factory or compression of the fluid due to changes in the temperature in the engine compartment or the like. Moreover, if the fluid level is low, the fluid level detecting apparatus may activate and the hydraulic control mode may end up being changed even if the reason for the fluid level being low is because of worn brake pads and not a leak.

Normally an electronically controlled brake system is configured such that if a fluid leak is detected, the control mode is switched to a failsafe mode in which fluid in the master cylinder is supplied directly to the wheel cylinder. In this failsafe mode, the braking force is less than it is in the control mode during normal operation so it is not preferable to change the control mode often due to an erroneous leak determination.

However, in compact vehicles and the like, it is sometimes difficult to provide a reservoir having a large enough capacity due to the issue of space in the engine compartment. Also, in recent years, there is a demand to ensure sufficient space between the hood of the engine compartment and the reservoir in order to protect pedestrians in the event of a vehicle crash, so it is becoming increasingly difficult to provide a reservoir with a large enough capacity to prevent erroneous leak determinations.

SUMMARY OF THE INVENTION

This invention thus provides a brake control system and a brake control method, which can inhibit a change in a hydraulic control mode due to an erroneous leak determination, while reducing the size of a reservoir.

A first aspect of the invention relates to a brake control system that includes a reservoir that stores fluid; fluid level detecting means for detecting the level of fluid in the reservoir; warning issuing means for issuing a first warning when it is detected that the level of fluid in the reservoir has reached a predetermined first fluid level; and hydraulic controlling means for changing a hydraulic control mode that is performed until it is detected, after the first warning has been issued, that the fluid level has reached a predetermined second fluid level that is lower than the first fluid level.

According to this aspect, a warning is first issued when the fluid level drops a small amount. If the fluid level drops further, then the hydraulic control mode is changed. A warning is always issued before the control mode is changed so the user has a chance to take appropriate steps to increase the fluid level before the control mode is changed. This makes it possible to inhibit a case in which the control mode is changed due to an erroneous leak determination.

The fluid level detecting means may include a fixed member that is fixed to the reservoir, and a first float and a second float which move up and down with respect to the fixed member according to the level of the fluid. The fluid level detecting means may detect that the fluid level has reached the first fluid level when the first float is located at a predetermined first position with respect to the fixed member. The fluid level detecting means may detect that the fluid level has reached the second fluid level when the second float is located at a predetermined second position with respect to the fixed member. In this case, the fluid level detecting means can detect two fluid levels using a single common fixed member, which enables the apparatus to be made at low cost.

The fixed member may include a first switch that is switched from off to on when the first float reaches the first position, and a second switch that is switched from on to off when the second float reaches the second position. In this case, the first and second floats can be arranged vertically, which enables the reservoir to be made smaller.

The first float and the second float may be arranged on the same axis inside the reservoir. This enables the reservoir to be made smaller than it is when the axis of the first float and the axis of the second float are offset from one another.

The brake control system may also include a pump that discharges the fluid out of the reservoir. Also, the inside of the reservoir may be divided into at least two areas by a partition wall, and the second float may be arranged in an area that is communicated with the pump. The reservoir can be made smaller by arranging the second float in the area where there is comparatively more room in the reservoir.

The fluid level detecting means may include a fixed member that is fixed to the reservoir, a third switch and a fourth switch which are provided on the fixed member, and a third float that moves up and down with respect to the fixed member according to the level of the fluid. Also, it may be detected that the fluid level has reached the first fluid level when the third float has reached a predetermined third position with respect to the third switch of the fixed member, and it may be detected that the fluid level has reached the second fluid level when the third float has reached a predetermined fourth position with respect to the fourth switch of the fixed member. In this case, two fluid levels, i.e., the first fluid level and the second fluid level, can be detected using a single float, which simplifies the structure so that the brake control system can be made at low cost, and also enables the reservoir to be smaller.

The fluid level determining means may include second fluid level estimating means for estimating that the fluid level has reached the second fluid level after it has been detected that the fluid level has reached the first fluid level. In this case, there is no need to provide means for mechanically detecting that the fluid level has reached the second fluid level, which enables the brake control system to be made at low cost and enables the reservoir to be smaller.

The second fluid level estimating means may estimate that the fluid level has reached the second fluid level when a first predetermined period of time has passed after it has been detected that the fluid level has reached the first fluid level. If there is a leak, the fluid level will drop as time passes so it is possible to detect that the fluid level has reached the second fluid level by monitoring the time.

The second fluid level estimating means may estimate that the fluid level has reached the second fluid level, when the number of brake operations after it has been detected that the fluid level has reached the first fluid level is equal to or greater than a first predetermined number. The fluid level is able to be estimated based on the number of brake operations because the fluid level in the reservoir decreases the more the brake is operated.

In this way, by estimating the time after the fluid level has reached the first fluid level or estimating the fluid level based on the number of brake operations, the second fluid level can be detected even when it is difficult to detect the actual fluid level due to vehicle vibrations or the like.

The warning issuing means may issue a second warning that differs from the first warning when it is detected that the fluid level has reached a third fluid level that is between the first fluid level and the second fluid level. The warning method may be changed such that the first warning is a visible warning such as the illumination of a lamp and the second warning is an audible warning such as a buzzer, for example. As a result, even if the lamp is difficult to see because it is bright inside the vehicle, the audible warning will be issued, so the warning is repetitive. Moreover, steps can be taken to increase the fluid level at the first warning, making it possible to inhibit a warning by a bothersome noise.

The fluid level detecting means may include third fluid level estimating means for estimating that the fluid level has reached the third fluid level after it has been detected that the fluid level has reached the first fluid level.

The third fluid level estimating means may estimate that the fluid level has reached the third fluid level when a second predetermined period of time has passed after it has been detected that the fluid level has reached the first fluid level. The second predetermined period of time is shorter than the first predetermined period of time described above.

The third fluid level estimating means may estimate that the fluid level has reached the third fluid level when the number of brake operations after it has been detected that the fluid level has reached the first fluid level is equal to or greater than a second predetermined number. The second predetermined number is less than the first predetermined number described above.

In this case, the third fluid level can be detected without increasing the number of floats, which simplifies the structure so that the brake control system can be made at low cost, as well as enables the reservoir to be smaller.

The warning issuing means may issue the first warning after a third predetermined period of time has passed after it has been detected that the fluid level has reached the first fluid level. This makes it possible to suppress a warning from being erroneously issued in the event that the fluid level temporarily drops due to vibration of the vehicle or the like.

The brake control system may also include a pump that discharges fluid out of, the reservoir. Further, the hydraulic controlling means may perform hydraulic control using the control mode that differs from the normal control mode when an accumulated operating time of the pump equal to or longer than a fourth predetermined period of time has passed after it has been detected that the fluid level has reached the second fluid level. Even when the fluid in the reservoir is low, there may still be some fluid remaining around the pump. Therefore, brake control in the normal control mode can be performed for as long as possible by inhibiting the control mode from changing until the accumulated operating time of the pump equal to or longer than a predetermined period of time has passed.

The hydraulic controlling means may perform hydraulic control using the control mode that differs from the normal control mode when the number of brake operations is equal to or greater than a third predetermined number after it has been detected that the fluid level has reached the second fluid level. Therefore, brake control in the normal control mode can be performed for as long as possible when this kind of control is performed as well.

A first magnetic member may be provided on the first float and a second magnetic member may be provided on the second float, and the first switch may be switched from off to on when magnetic force from the first magnetic member on the first float is applied, and the second switch may be switched from on to off when magnetic force from the second magnetic member on the second float is not applied.

A third magnetic member may be provided on the third float, and the third switch and the fourth switch may be switched from off to on when magnetic force from the third magnetic member on the third float is applied.

A second aspect of the invention relates to a brake control method that includes detecting a level of fluid in a reservoir that stores fluid; issuing a first warning when it is detected that the fluid level has reached a predetermined first fluid level; and changing a hydraulic control mode that is performed until it is detected, after the first warning has been issued, that the fluid level has reached a predetermined second fluid level that is lower than the first fluid level.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Hereinafter, example embodiments of the invention will be described in detail with reference to the accompanying drawings.

Figure 1:
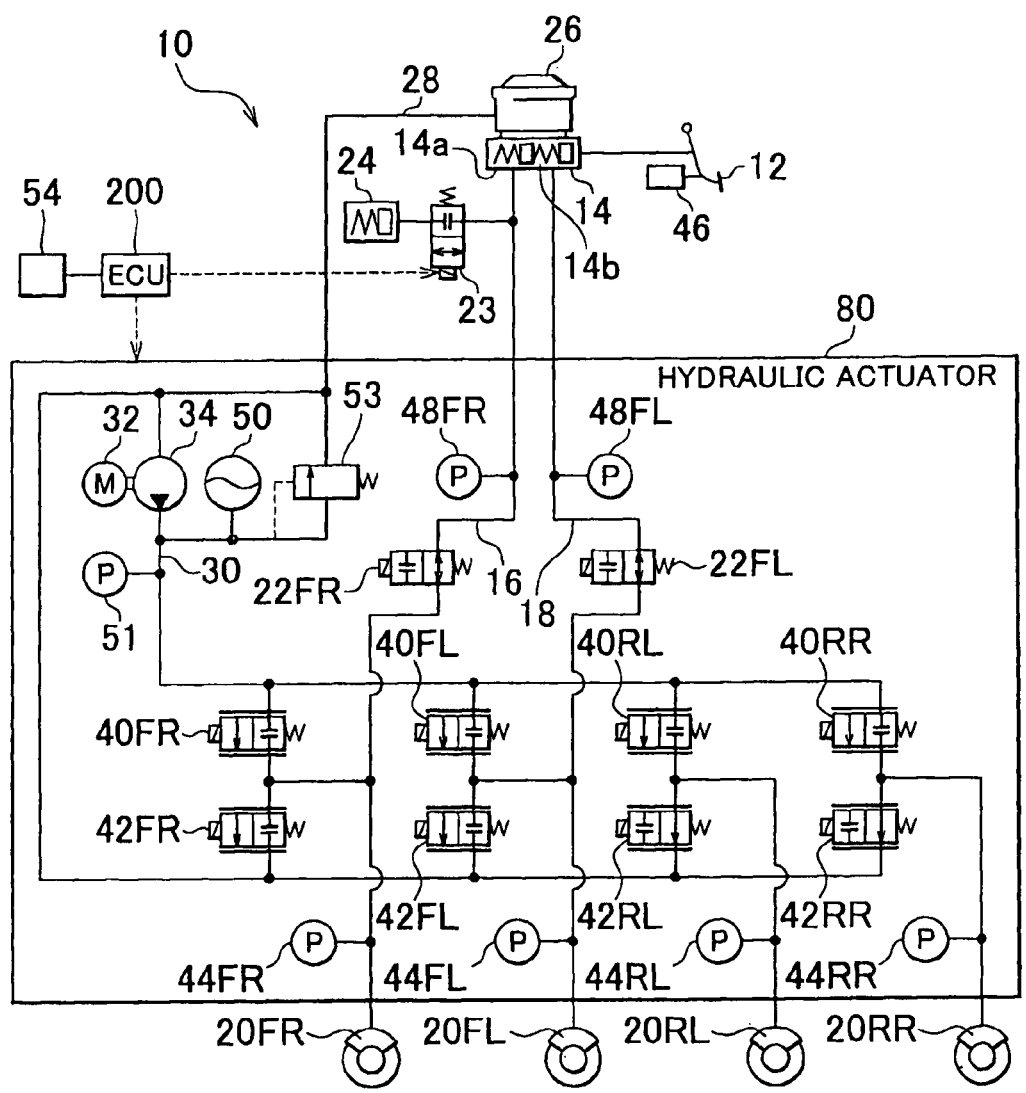
FIG. 1 is a schematic diagram of a brake control system according to an example embodiment of the invention.

FIG. 1 is a schematic diagram of a brake control system 10 according to an example embodiment of the invention. This brake control system 10 is an electronically controlled brake (ECB) system for a vehicle, which optimally controls the brakes of four wheels of the vehicle based on an operating amount of a brake pedal 12 which is a brake operating member.

The brake pedal 12 is connected to a master cylinder 14 that discharges fluid, i.e., hydraulic fluid, according to a depression operation performed by a driver. Also, a stroke sensor 46 that detects the depression stroke is provided with the brake pedal 12.

A stroke simulator 24 that generates reaction force corresponding to the operating force with which the brake pedal 12 is depressed by the driver, is connected to one output port 14a of the master cylinder 14. A simulator cutoff valve 23 is provided midway in the flow line connecting the master cylinder 14 with the stroke simulator 24. The simulator cutoff valve 23 is a normally closed electromagnetic switching valve which is closed when de-energized and opens when operation of the brake pedal 12 by the driver is detected.

A reservoir 26 for storing fluid is connected to the master cylinder 14. The structure of this reservoir 26 will be described in detail later. A fluid level detecting apparatus 100 (see FIG. 2) that detects the level of fluid in the reservoir 26 is provided in the reservoir 26.

A right front wheel brake pressure control line 16 is connected at one end to one output port 14a of the master cylinder 14, and at the other end to a right front-wheel wheel cylinder 20FR that applies braking force to a right front wheel, not shown. Similarly, a left front wheel brake pressure control line 18 is connected at one end to the other output port 14b of the master cylinder 14, and at the other end to a left front-wheel wheel cylinder 20FL that applies braking force to a left front wheel, not shown. A right electromagnetic switching valve 22FR is provided midway in the right front wheel brake pressure control line 16, and a left electromagnetic switching valve 22FL is provided midway in the left front wheel brake pressure control line 18. The right electromagnetic switching valve 22FR and the left electromagnetic switching valve 22FL are both normally open electromagnetic valves which are open when de-energized and close when energized (i.e., when current is supplied).

Further, a right master pressure sensor 48FR that detects the master cylinder pressure on the right front wheel side is provided midway in the right front wheel brake pressure control line 16. Similarly, a left master pressure sensor 48FL that detects the master cylinder pressure on the left front wheel side is provided midway in the left front wheel brake pressure control line 18. With the brake control system 10, when the driver depresses the brake pedal 12, the depression amount is detected by the stroke sensor 46. However, the force with which the brake pedal 12 is depressed (i.e., the depression force) can also be obtained from the master cylinder pressure detected by the right master pressure sensor 48FR and the left master pressure sensor 48FL. In this way, supposing that the stroke sensor 46 were to fail, it is preferable from the viewpoint of a failsafe to monitor the master cylinder pressure using both the right master pressure sensor 48FR and the left master pressure sensor 48FL.

One end of a hydraulic pressure supply and discharge line 28 is connected to the reservoir tank 26. The other end of this hydraulic pressure supply and discharge line 28 is connected to an inlet of an oil pump 34 which is driven by a motor 32. An outlet of the oil pump 34 is connected to a high pressure line 30. An accumulator 50 and a relief valve 53 are also connected to this high pressure line 30. In this example embodiment, the oil pump 34 is a reciprocating pump which has at least two pistons, not shown, that are driven in a reciprocating fashion by the motor 32. Also, the accumulator 50 in this example embodiment is an accumulator that converts the pressure energy of the fluid into pressure energy of a filler gas such as nitrogen and stores it.

The accumulator 50 stores fluid that has been pressurized to approximately 14 to 22 MPa, for example, by the oil pump 34. Further, a valve outlet of the relief valve 53 is connected to the hydraulic pressure supply and discharge line 28 such that if the pressure of the fluid in the accumulator 50 becomes abnormally high, e.g., approximately 25 MPa, the relief valve 53 will open to return the high-pressure fluid to the hydraulic pressure supply and discharge line 28. Moreover, an accumulator pressure sensor 51 that detects the outlet pressure of the accumulator 50, i.e., the pressure of the fluid in the accumulator 50, is provided in the high pressure line 30.

The high pressure line 30 is connected to a right front-wheel wheel cylinder 20FR via a pressure increase valve 40FR, a left front-wheel wheel cylinder 20FL via a pressure increase valve 40FL, a right rear-wheel wheel cylinder 20RR via a pressure increase valve 40RR, and a left rear-wheel wheel cylinder 20RL via a pressure increase valve 40RL. The pressure increase valves 40FR to 40RL are all normally closed electromagnetic flowrate control valves (linear valves) which are closed when de-energized and used to increase the pressure in the wheel cylinders 20FR to 20RL as necessary. Incidentally, a disc brake unit is provided for each wheel of the vehicle, not shown. Each of these disc brake units generates braking force by pressing a brake pad against a disc through operation of the corresponding wheel cylinder 20FR to 20RL.

Also, the right front-wheel wheel cylinder 20FR is connected to the hydraulic pressure supply and discharge line 28 via a pressure decrease valve 42FR, and the left front-wheel wheel cylinder 20FL is connected to the hydraulic pressure supply and discharge line 28 via a pressure decrease valve 42FL. The pressure decrease valves 42FR and 42FL are both normally closed electromagnetic flowrate control valves (linear valves) used to decrease the pressure in the wheel cylinders 20FR and 20FL as necessary. Similarly, the right rear-wheel wheel cylinder 20RR is connected to the hydraulic pressure supply and discharge line 28 via a pressure decrease valve 42RR, and the left rear-wheel wheel cylinder 20RL is connected to the hydraulic pressure supply and discharge line 28 via a pressure decrease valve 42RL. The pressure decrease valves 42RR and 42RL are both normally open electromagnetic flowrate control valves.

Also, the brake control system 10 according to this example embodiment includes wheel cylinder pressure sensors that detect the wheel cylinder pressure, which is the fluid pressure acting on the wheel cylinders. That is, a right front-wheel wheel cylinder pressure sensor 44FR is provided near the right front-wheel wheel cylinder 20FR and controls the fluid pressure acting on that wheel cylinder 20FR, a left front-wheel wheel cylinder pressure sensor 44FL is provided near the left front-wheel wheel cylinder 20FL and controls the fluid pressure acting on that wheel cylinder 20FL, a right rear-wheel wheel cylinder pressure sensor 44RR is provided near the right rear-wheel wheel cylinder 20RR and controls the fluid pressure acting on that wheel cylinder 20RR, and a left rear-wheel wheel cylinder pressure sensor 44RL is provided near the left rear-wheel wheel cylinder 20RL and controls the fluid pressure acting on that wheel cylinder 20RL.

The right electromagnetic switching valve 22FR, the left electromagnetic switching valve 22FL, the pressure increase valves 40FR to 40RL, the pressure decrease valves 42FR to 42RL, the oil pump 34, the accumulator 50 and the like together make up a hydraulic actuator 80 of the brake control system 10. This hydraulic actuator 80 is controlled by an electronic control unit (hereinafter simply referred to as "ECU") 200.

The ECU 200 includes a CPU that executes various operations, ROM in which various control programs are stored, RAM which is used to store data and as a work area for executing programs, nonvolatile memory such as backup RAM that can retain stored content even when the engine is off, an input/output interface, an A/D converter for converting analog signals received from various sensors and the like into digital signals and reading them, and a timer such as a clock, and the like.

The ECU 200 is electrically connected to various actuators including the hydraulic actuator 80 of the electromagnetic switching valves 22FR and 22FL, the simulator cutoff valve 23, the pressure increase valves 40FR to 40RL, and the pressure decrease valves 42FR to 42RL, and the like.

The ECU 200 is also electrically connected to various sensors and switches that detect signals for use in control. That is, the ECU 200 receives signals indicative of the wheel cylinder pressure in the wheel cylinders 20FR to 20RL from the wheel cylinder pressure sensors 44FR to 44RL.

The ECU 200 also receives a signal indicative of the pedal stroke of a brake pedal 12 from the stroke sensor 46, a signal indicative of the master cylinder pressure from the right master pressure sensor 48FR and the left master pressure sensor 48FL, and a signal indicative of the accumulator pressure from the accumulator pressure sensor 51.

The ECU 200 also receives a signal indicative of the fluid level from the fluid level detecting apparatus 100 (see FIG. 2) provided in the reservoir 26. Also, the ECU 200 is connected to a warning lamp 54 for notifying the driver that the fluid level in the reservoir 26 is low.

Moreover, the ECU 200 receives a signal indicative of the wheel speed of each wheel from a wheel speed sensor provided on each wheel, a signal indicative of the yaw rate from a yaw rate sensor, and a signal indicative of the steering angle of a steering wheel from a steering angle sensor. Incidentally, these sensors are shown in the drawings.

In the brake control system 10 having this kind of structure, when the driver depresses the brake pedal 12, the ECU 200 calculates a target deceleration of the vehicle from the pedal stroke indicative of the depression amount of the brake pedal 12, and the master cylinder pressure, and then obtains a target pressure, which is a target value for the wheel cylinder pressure of each wheel, according to the calculated target deceleration. Then the ECU 200 controls the pressure increase valves 40FR to 40RL and the pressure decrease valves 42FR to 42FL, such that the wheel cylinder pressure of each wheel matches the target pressure.

Meanwhile, the electromagnetic switching valves 22FR and 22FL are closed and the simulator cutoff valve 23 is open at this time. Therefore, fluid sent from the master cylinder 14 when the brake pedal 12 is depressed by the driver flows through the simulator cutoff valve 23 and into the stroke simulator 24.

Also, when the accumulator pressure is less than a lower limit value of a preset control range, the ECU 200 drives the oil pump 34 to increase the accumulator pressure and then stops the oil pump 34 when the accumulator pressure enters that control range.

Figure 2:
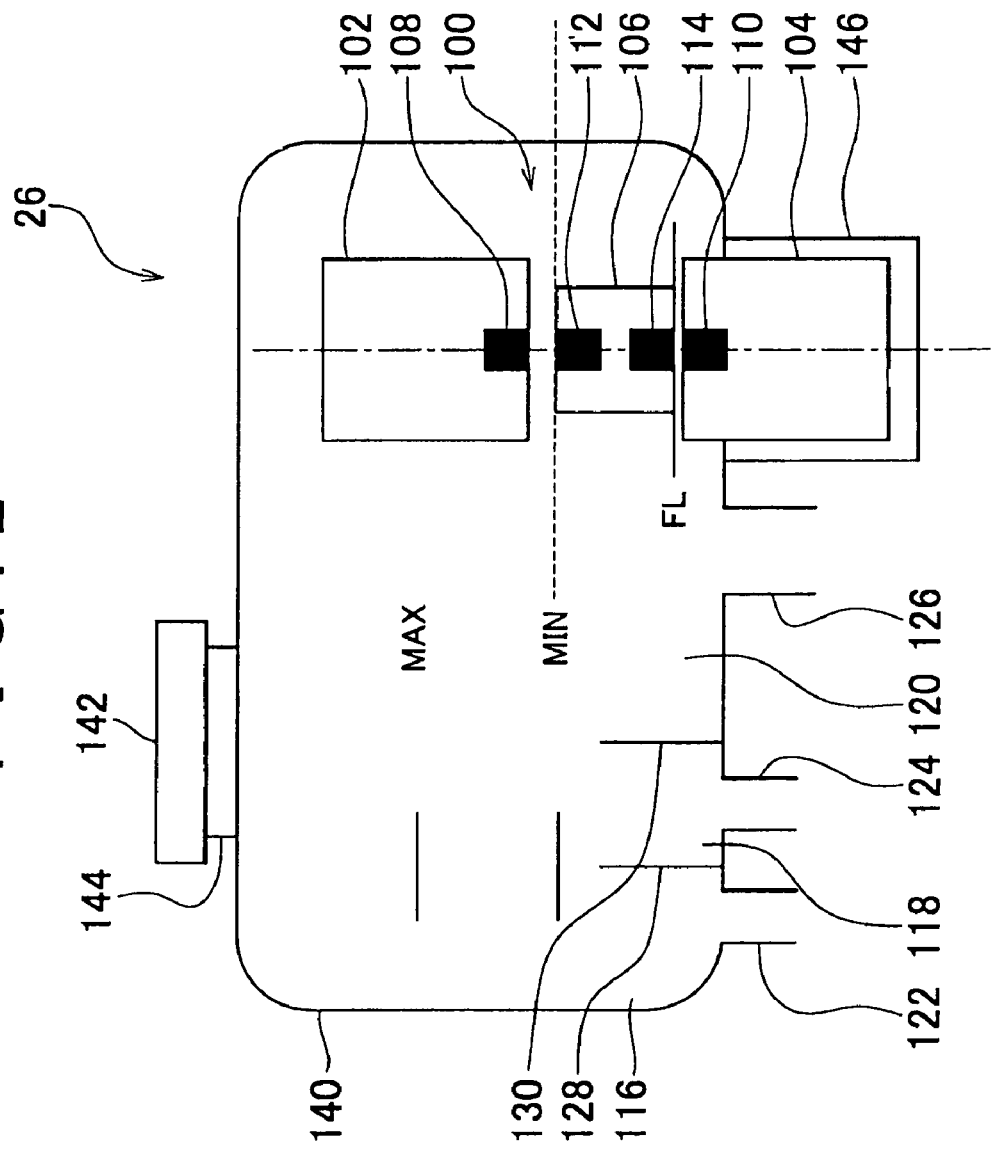
FIG. 2 is a view showing the structure of a reservoir.

FIG. 2 is a view showing the structure of the reservoir 26. A main body 140 of the reservoir 26 is made of composite resin and formed in the shape of a cylinder with a bottom such that fluid can be stored inside. An open portion 144 for filling fluid is formed in an upper portion of the main body 140. A cap 142 for closing the open portion 144 is fixedly fitted to this open portion 144.

As shown in FIG. 2, three reference fluid levels are set in the main body portion 140, i.e., a maximum fluid level MAX, a minimum fluid level MIN, and a failsafe mode operation fluid level FL. The maximum fluid level MAX is set to a value below the top surface of the main body portion 140. The minimum fluid level MIN is set so as to ensure that there is enough fluid to stably apply appropriate braking force to the wheel cylinders 20FR to 20RL of all four wheels. The failsafe mode operation fluid level FL is set lower than the minimum fluid level MIN and indicates a fluid level at which the brake control system 10 should be controlled in a failsafe mode, which will be described later. The maximum fluid level MAX, the minimum fluid level MIN, and the failsafe mode operation fluid level FL all differ depending on the reservoir 26 and the hydraulic actuator 80 and thus may be set appropriately through testing and simulation.

A first partition wall 128 and a second partition wall 130 are formed extending upward from the floor (i.e., the bottom surface) of the main body portion 140. The heights of the upper end portions of the first partition wall 128 and the second partition wall 130 are below the minimum fluid level MIN.

The first partition wall 128 and the second partition wall 130 divide the space inside the main body portion 140 below the minimum fluid level MIN into three areas. That is, a first fluid storing chamber 116 is formed between the first partition wall 128 and one side wall of the main body portion 140, a second fluid storing chamber 118 is formed between the first partition wall 128 and the second partition wall 130, and a normal control chamber 120 is formed between the second partition wall 130 and the other side wall of the main body portion 140.

A first connecting portion 122 for connecting the first fluid storing chamber 116 to one output port 14a of the master cylinder 14 is formed in the floor of the first fluid storing chamber 116. A second connecting portion 124 for connecting the second fluid storing chamber 118 to the other output port 14b of the master cylinder 14 is formed in the floor of the second fluid storing chamber 118, and a third connecting portion 126 for connecting the normal control chamber 120 to the inlet of the oil pump 34 is formed in the floor of the normal control chamber 120.

The fluid level detecting portion 100 that detects the level of fluid in the reservoir 26 is provided in the main body portion 140. The fluid level detecting apparatus 100 includes a fixed member 106 which is fixed to the reservoir 26, a first float 102 provided above the fixed member 106, and a second float 104 provided below the fixed member 106.

The first float 102 and the second float 104 are floats that float in the fluid, and are provided so as to move up and down with respect to the fixed member 106 as the fluid increases and decreases. A guide portion, not shown, that restricts the lateral movement of the first float 102 is formed to the side of the first float 102. The second float 104 moves up and down inside a float chamber 146 provided below the normal control chamber 120.

A first magnet 108 is provided on a lower portion of the first float 102, and a second magnet 110 is provided on an upper portion of the second float 104. Also, a first reed switch 112 is provided on an upper portion of the fixed member 106, and a second reed switch 114 is provided on a lower portion of the fixed member 106. The first reed switch 112 and the second reed switch 114 are switched from off to on when magnetic force is applied. The first reed switch 112 is provided in a position that is generally the same height as the minimum fluid level MIN and functions as a warning issuing switch. The second reed switch 114 is provided in a position that is generally the same height as the failsafe mode operation fluid level FL and functions as a failsafe mode operating switch.

The fluid level detecting apparatus 100 detects that the fluid level has reached the minimum fluid level MIN when the fixed member 106 and the first float 102 come to be in a predetermined first positional relationship. In this example embodiment, the predetermined first positional relationship between the fixed member 106 and the first float 102 is a positional relationship in which the first magnet 108 provided on the first float 102 acts on the first reed switch 112 provided on the fixed member 106, thereby switching the first reed switch 112 from off to on.

When the fluid level is sufficiently higher than the minimum fluid level MIN, the first magnet 108 does not act on the first reed switch 112 so the first reed switch 112 is off. If the fluid level drops so that the lower surface of the first float 102 falls to the minimum fluid level MIN, the first magnet 108 acts on the first reed switch 112 so the first reed switch 112 is switched from off to on.

Also, the fluid level detecting apparatus 100 detects that the fluid level has reached the failsafe mode operation fluid level FL when the fixed member 106 and the second float 104 come to be in a predetermined second positional relationship. In this example embodiment, the predetermined second positional relationship between the fixed member 106 and the second float 104 is a positional relationship in which the second magnet 110 provided on the second float 104 no longer acts on the second reed switch 114 provided on the fixed member 106, thereby switching the second reed switch 114 from on to off.

When the fluid level is higher than the failsafe mode operation fluid level FL, buoyancy causes the upper surface of the second float 104 to abut against the lower surface of the fixed member 106. As a result, the second magnet 110 acts on the second reed switch 114 so the second reed switch 114 is on. If the fluid level drops below the failsafe mode operation fluid level FL, the second magnet 110 stops acting on the second reed switch 114 so the second reed switch 114 is switched from on to off.

In this way, with this example embodiment it is possible to detect two fluid levels, i.e., the minimum fluid level MIN and the maximum fluid level MAX, using two floats, i.e., the first float 102 and the second float 104. In this fluid level detecting apparatus 100, the fixed member 106 is common to both the first float 102 and the second float 104, which enables the apparatus to be made at low cost. Also, the first float 102 and the second float 104 are arranged vertically so the reservoir 26 can be reduced in size.

The first float 102 and the second float 104 are preferably arranged on the same axis, as shown in FIG. 2. This enables the fluid level detecting apparatus 100 to be made smaller than it can be when the axis of the first float 102 and the axis of the second float 104 are offset, and as a result, the reservoir 26 can be made smaller.

Also, the second float 104 is preferably arranged in the normal control chamber 120 of the reservoir 26. Arranging the second float 104 in the normal control chamber 120, which has comparatively more space, in the reservoir 26 enables the reservoir 26 to be made smaller.

Figure 3:
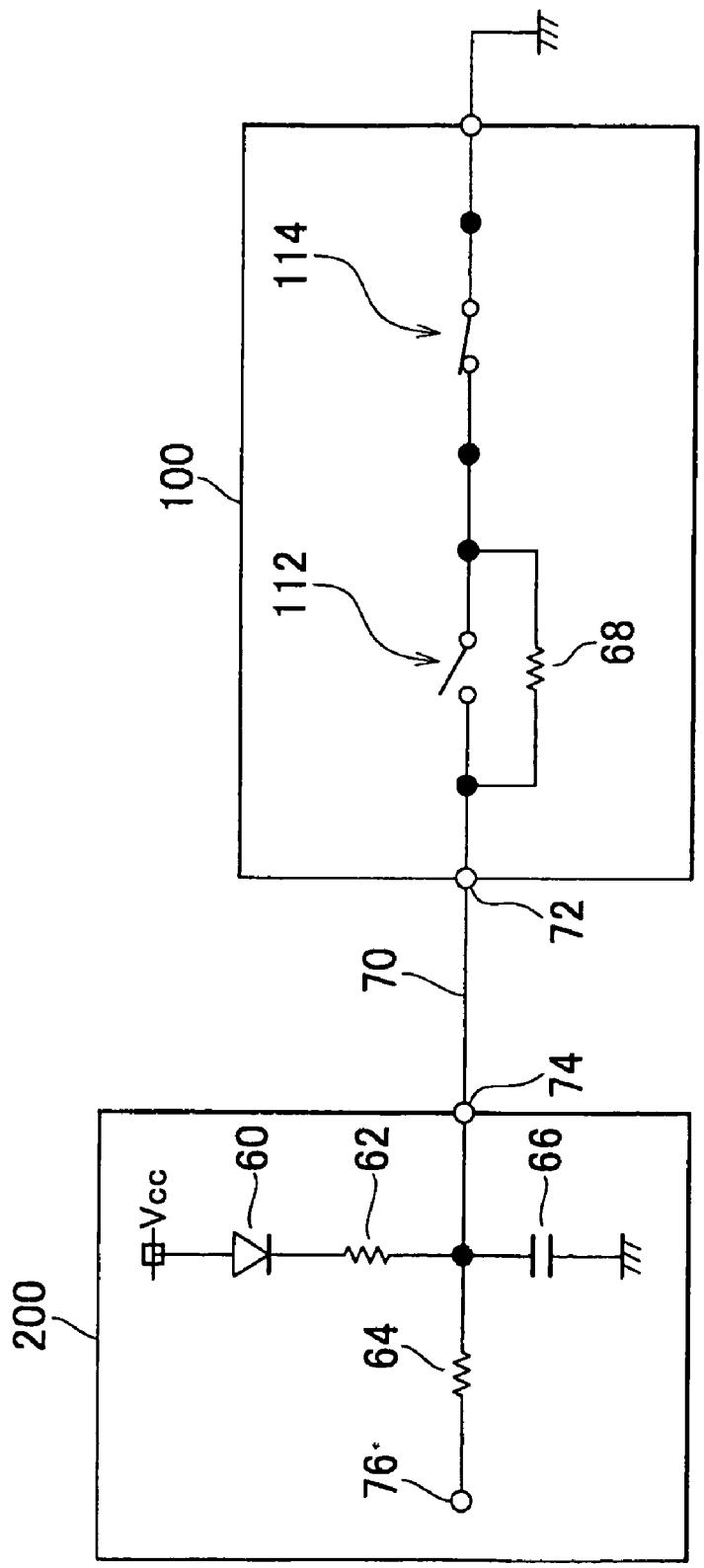
FIG. 3 is a diagram showing the circuit configuration of a fluid level detecting apparatus and an ECU.
Figure 4:
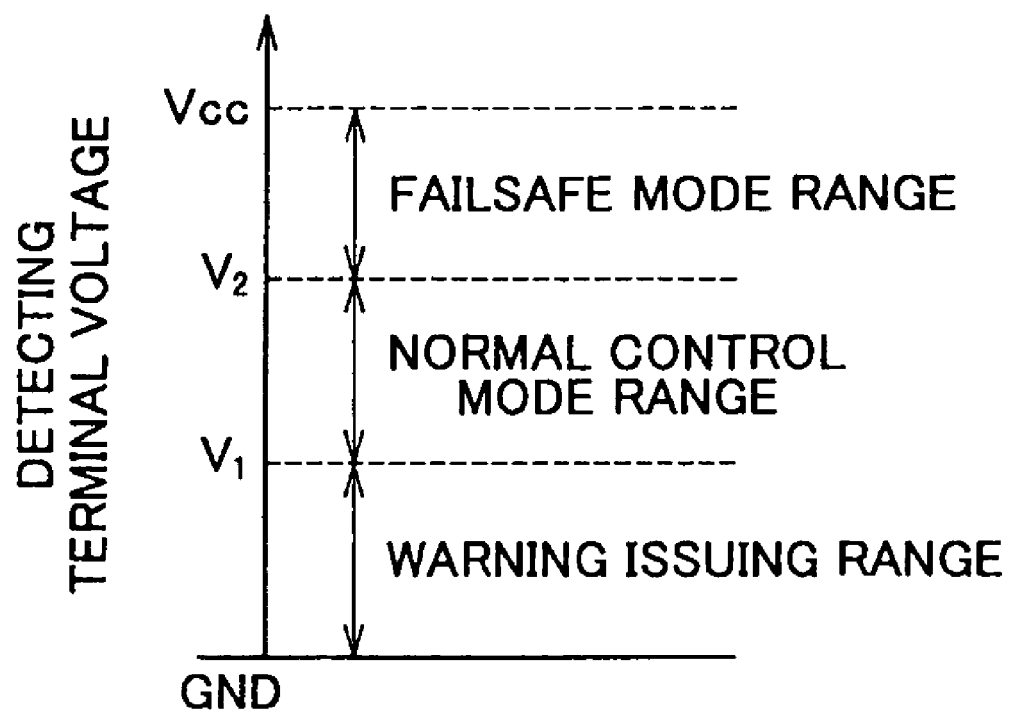
FIG. 4 is a chart showing control mode switching.

Next, the operation of the fluid level detecting apparatus 100 will be described with reference to FIGS. 3 and 4. FIG. 3 is a diagram showing the circuit configuration of the fluid level detecting apparatus 100 and the ECU 200. The fluid level detecting apparatus 100 and the ECU 200 shown in FIG. 3 together make up fluid level detecting means for detecting the fluid level. FIG. 4 is a chart showing control mode switching.

As shown in FIG. 3, in the fluid level detecting apparatus 100, the first reed switch 112 and the second reed switch 114 are connected in series. The other end of the second reed switch 114 is grounded, and the other end of the first reed switch 112 is connected to an output terminal 72. Also, a resistor 68 is connected in parallel to the first reed switch 112. The output terminal 72 of the fluid level detecting apparatus 100 is connected to an input terminal 74 of the ECU 200 via a signal line 70.

The ECU 200 includes a diode 60, resistors 62 and 64, and a condenser 66. Of the circuits of the ECU 200, the circuit of the ECU 200 that is shown in FIG. 3 represents a circuit that is connected to the fluid level detecting apparatus 100. An anode of the diode 60 is connected to a power source voltage Vcc of the ECU 200, and a cathode of the diode 60 is connected to one end of the resistor 62. The other end of the resistor 62 is connected to one end of the condenser 66, while the other end of the condenser 66 is grounded. Also, one end of the resistor 64 as well as the input terminal 74 of the ECU 200 are connected to the other end of the resistor 62. The other end of the resistor 64 is a detecting terminal 76 for detecting a signal from the fluid level detecting apparatus 100.

The states of the first reed switch 112 and the second reed switch 114 shown in FIG. 3 are indicative of a case in which the fluid level in the reservoir 26 is sufficiently higher than minimum fluid level MIN, such that the first reed switch 112 is off and the second reed switch 114 is on. At this time, the voltage at the detecting terminal 76 is equal to the difference of the power supply voltage Vcc minus the offset voltage of the diode 60, divided by the resistance of the resistor 62 and the resistance of the resistor 68 (i.e., a voltage between voltages V1 and V2 in FIG. 4).

When the voltage at the detecting terminal 76 is in the range of voltages V1 to V2, the ECU 200 which serves as hydraulic controlling means, performs brake control in the normal control mode. When the brake pedal 12 is depressed in this normal control mode, a target pressure is determined according to the operating amount of the brake pedal 12. Then the oil pump 34 is driven and the right electromagnetic switching valve 22FR and the left electromagnetic switching valve 22FL are closed. After this, the current supplied to the pressure increase valves 40FR to 40RL and the pressure decrease valves 42FR to 42RL for all four wheels is controlled so that the wheel cylinder pressure comes to match the target pressure.

If the fluid level drops to the minimum fluid level MIN, the first reed switch 112 is switched from off to on. As a result, the detecting terminal 76 is shorted to the ground potential so the voltage at the detecting terminal 76 becomes a voltage between the ground potential (GND) and voltage V1 in FIG. 4. When the voltage at the detecting terminal 76 is in the range of GND to V1, the ECU 200 issues a warning to the driver by illuminating the warning lamp 54. The warning issuing means in this case is not limited to the warning lamp, i.e., it may also be a sound such as a buzzer.

The ECU 200 may also issue a warning after a predetermined period of time has passed after it has been detected that the fluid level has reached the minimum fluid level MIN. This makes it possible to suppress a warning from being erroneously issued in the event that the fluid level temporarily drops due to vibration of the vehicle. This predetermined period of time may be set through testing to an optimum fixed time or set as the accumulated operating time of the oil pump 34.

If, after a warning has been issued, the fluid level drops further to the failsafe mode operation fluid level FL, the second reed switch 114 is switched from on to off. As a result, the voltage at the detecting terminal 76 becomes equal to the power supply voltage Vcc minus the offset voltage of the diode 60 (i.e., a voltage between voltages V2 and Vcc in FIG. 4). When the voltage of the detecting terminal 76 is in this range between the voltages V2 and Vcc, the ECU 200 performs brake control in a control mode that is different from before. In this example embodiment, the control mode is switched to the failsafe mode.

In the failsafe mode, the right electromagnetic switching valve 22FR and the left electromagnetic switching valve 22FL are open and fluid is supplied from the master cylinder 14 directly to the wheel cylinders 20FR and 20FL. Also, the hydraulic pressure of the left rear-wheel wheel cylinder 20RL and the right rear-wheel wheel cylinder 20RR is controlled by closing the pressure increase valves 40FR and 40FL and the pressure decrease valves 42FR and 42FL and controlling the current supplied to the pressure increase valves 40RL and 40RR and the pressure decrease valves 42RL and 42RR. As a result, the braking force decreases.

In this way, in the brake control system 10 according to this example embodiment, a warning is issued when the fluid level reaches the minimum fluid level MIN, and the control mode changes to the failsafe mode if the fluid level reaches the failsafe mode operation fluid level FL after the warming has been issued. Therefore, a warning is always issued before the control mode is switched to the failsafe mode, so the control mode will not suddenly change without warning. This enables the user to take steps to increase the fluid level before the control mode switches, which making it possible to inhibit the control mode from changing due to an erroneous leak determination.

The ECU 200 may also perform hydraulic control in a control mode that is different from before when the accumulated operating time of the oil pump 34 equal to or longer than a predetermined period of time has passed after the fluid level detecting apparatus 100 has detected that the fluid level has reached the failsafe mode operation fluid level FL.

Even when the fluid in the reservoir 26 is low, there may still be some fluid remaining around the oil pump 34. Therefore, brake control in the normal control mode can be performed for as long as possible by inhibiting the control mode from changing until the accumulated operating time of the oil pump 34 equal to or longer than a predetermined period of time has passed. This predetermined period of time may be set appropriately through testing.

Moreover, the ECU 200 may also perform hydraulic control in a control mode that is different from before when the number of brake operations is equal to or greater than a predetermined number after the fluid level detecting apparatus 100 has detected that the fluid level has reached the failsafe mode operation fluid level FL. Therefore, brake control in the normal control mode can be performed for as long as possible by performing this kind of control as well. The predetermined number may be set appropriately through testing.

Figure 5:
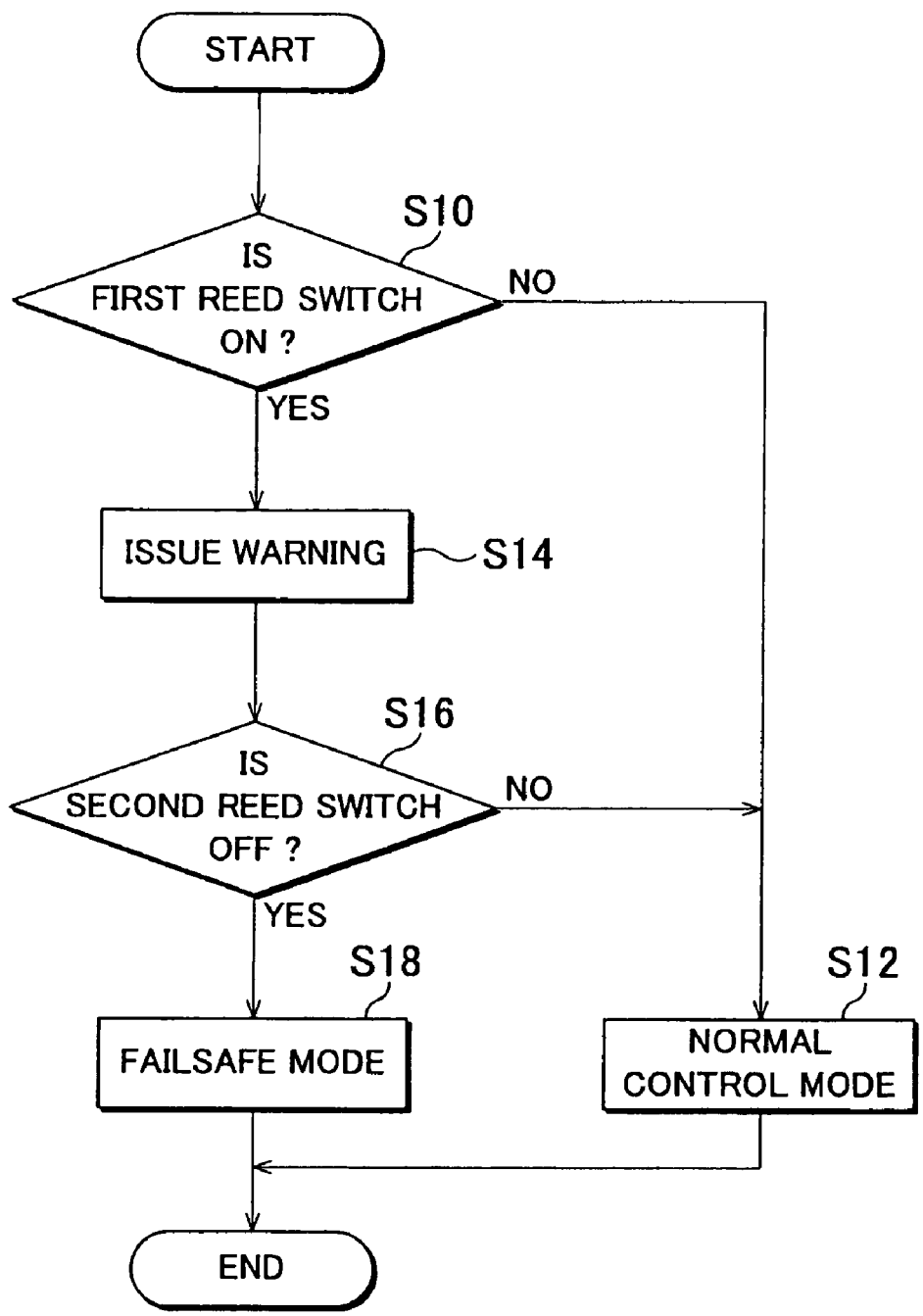
FIG. 5 is a flowchart illustrating control of the brake control system according to the example embodiment.

FIG. 5 is a flowchart illustrating the control of the brake control system 10 according to this example embodiment. The routine for this brake control is executed continuously at predetermined intervals of time. During normal operation, the brake control system 10 is controlled in the normal control mode.

First, the ECU 200 detects whether the first reed switch 112 has switched from off to on, based on a signal from the fluid level detecting apparatus 100 (step S10).

If the first reed switch 112 is still off (i.e., N in step S10), then the ECU 200 determines that the fluid level is above the minimum fluid level MIN and so performs brake control in the normal control mode (step S12).

If the first reed switch 112 is on (i.e., Y in step S10), then the ECU 200 determines that the fluid level has dropped to the minimum fluid level MIN and issues a warning to the driver by illuminating the warning lamp 54 (step S14).

After the warning has been issued, the ECU 200 detects whether the second switch 114 has switched from on to off, based on a signal from the fluid level detecting apparatus 100 (step S16).

If the second reed switch 114 is still on (i.e., N in step S16), the ECU 200 determines that the fluid level has not dropped to the failsafe mode operation fluid level FL and so performs brake control in the normal control mode (step S12).

If the second switch 114 is off (i.e., Y in step S16), the ECU 200 determines that the fluid level has dropped to the failsafe mode operation fluid level FL and switches the control mode to a different control mode than the control mode before it had been detected that the second switch 114 is off. That is, the ECU 200 switches the control mode from the normal control mode to the failsafe mode and then performs the control (step S18). Incidentally, the control mode is not switched if the control mode is already the failsafe mode.

In the fluid level detecting apparatus 100 shown in FIG. 2, the first float 102 and the second float 104 are arranged on the same axis. Alternatively, however, the axis of the first float 102 may be offset from the axis of the second float 104. For example, the first float 102 may be arranged in the center of the reservoir 26 and the second float 104 may be arranged in a peripheral portion of the normal control chamber 120 as shown in FIG. 2. Arranging the first float 102 in the center of the reservoir 26 enables the detection accuracy of the fluid level to be increased when the fluid level is at an angle.

Also, in the flowchart in FIG. 5, between the time that a warning is issued in step S14 and it is detected that the second reed switch 114 is off in step S16, the ECU 200 may switch the control mode to a mode that changes the braking force distribution of the wheels (hereinafter, this mode will be referred to as "leak suppressing mode") in order to ensure that there is enough fluid in the reservoir 26. This leak suppressing mode is a control mode that operates only two or three of the four wheel cylinders 20FR, 20FL, 20RL, and 20RR at a time, instead of operating all of them at the same time.

If there is a leak in one of the brakes of the four wheels, it is preferable to inactivate the brake with the leak. However, if the leak rate is slow, it is difficult to identify which brake is leaking. Therefore, by selectively supplying fluid to the wheel cylinder of each system, the leak can be reduced compared to when fluid is supplied to all of the wheel cylinders at the same time.

For example, when the wheel cylinders are activated in groups of three, the following activation states are set, i.e., a first activation state in which the wheel cylinders 20FR, 20FL, and 20RR are activated, a second activation state in which the wheel cylinders 20FR, 20FL, and 20RL are activated, a third activation state in which the wheel cylinders 20FR, 20RR, and 20RL are activated, and a fourth activation state in which the wheel cylinders 20FL, 20RR, and 20RL are activated. Braking force is then applied switching among the first to the fourth activation states in that order. As a result, the leak of the leaking brake can be suppressed even though the braking force applied is approximately three-fourths of the braking force that is normally applied. As a result, the rate of decrease in the fluid level in the reservoir 26 can be slowed, thus delaying the switch to operation in the failsafe mode.

Also, in the circuit of the fluid level detecting apparatus 100 shown in FIG. 3, the first reed switch 112 and the second reed switch 114 are connected in series, but they may also be connected in parallel. In this case, the circuit configuration of the ECU 200 can be simplified even though it is necessary to add the signal wire 70 that connects to the ECU 200.

Figure 6:
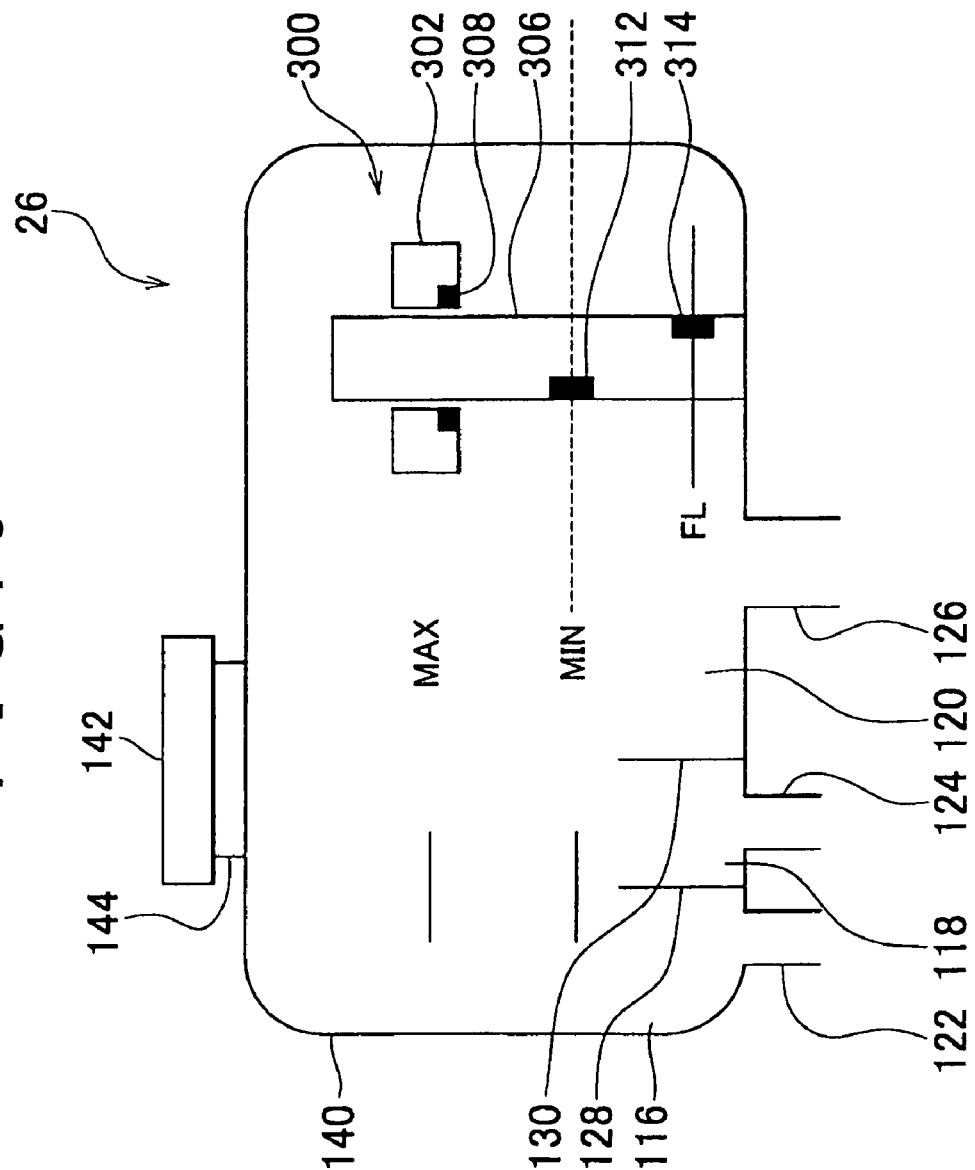
FIG. 6 is a view showing a modified example of the fluid level detecting apparatus according to the example embodiment.

FIG. 6 is a view of a modified example of the fluid level detecting apparatus according to the example embodiment described above. Constituent elements in FIG. 6 that are the same as, or which correspond to, constituent elements in FIG. 2 will be denoted by the same reference numerals and redundant descriptions will be omitted where appropriate.

A fluid level detecting apparatus 300 includes a rod-shaped fixed member 306 and a donut-shaped float 302. The fixed member 306 is formed in the normal control chamber 120 of the reservoir 26 so as to protrude upward from the floor of the main body portion 140. The float 302 has a hole in the center into which the fixed member 306 is inserted. The float 302 moves up and down along the rod-shaped fixed member 306 according to the fluid level. A donut-shaped magnet 308 is provided on a lower portion of the float 302.

Also, a first reed switch 312 and a second reed switch 314 are provided on the fixed member 306. The first reed switch 312 is provided in a position that is generally the same height as the minimum fluid level MIN and functions as a warning issuing switch. The second reed switch 314 is provided in a position that is generally the same height as the failsafe mode operation fluid level FL and functions as a failsafe mode operating switch.

The fluid level detecting apparatus 300 detects that, the fluid level has reached the minimum fluid level MIN when first reed switch 312 on the fixed member 306 and the float 302 come to be in a predetermined third positional relationship. In the fluid level detecting apparatus 300 shown in FIG. 6, the predetermined third positional relationship between the first reed switch 314 on the fixed member 306 and the float 302 is a positional relationship in which the magnet 308 provided on the float 302 acts on the first reed switch 312 provided on the fixed member 306, thereby switching the first reed switch 312 from off to on.

When the fluid level is sufficiently higher than the minimum fluid level MIN, the magnet 308 does not act on the first reed switch 312 so the first reed switch 312 is off. If the fluid level drops so that the lower surface of the float 302 falls to the minimum fluid level MIN, the magnet 308 acts on the first reed switch 312 so the first reed switch 312 is switched from off to on.

Also, the fluid level detecting apparatus 300 detects that the fluid level has reached the failsafe mode operation fluid level FL when the second reed switch 314 on the fixed member 306 and the float 302 come to be in a predetermined fourth positional relationship. In the fluid level detecting apparatus 300 shown in FIG. 6, the predetermined fourth positional relationship between the second reed switch 314 on the fixed member 306 and the float 302 is a positional relationship in which the magnet 308 provided on the float 302 acts on the second reed switch 314 provided on the fixed member 306, thereby switching the second reed switch 314 from off to on.

When the fluid level is higher than the failsafe mode operation fluid level FL, the magnet 308 does not act on the second reed switch 314 so the second reed switch 314 is off. If the fluid level drops so that the lower surface of the float 302 falls to the failsafe mode operation fluid level FL, the magnet 308 acts on the second reed switch 314 so the second reed switch 314 is switched from off to on. Incidentally, in the fluid level detecting apparatus 300, the sensitivity of the first reed switch 312 is set high so that the first reed switch 312 remains on even if the lower surface of the float 302 drops to the failsafe mode operation fluid level FL.

Figure 7:
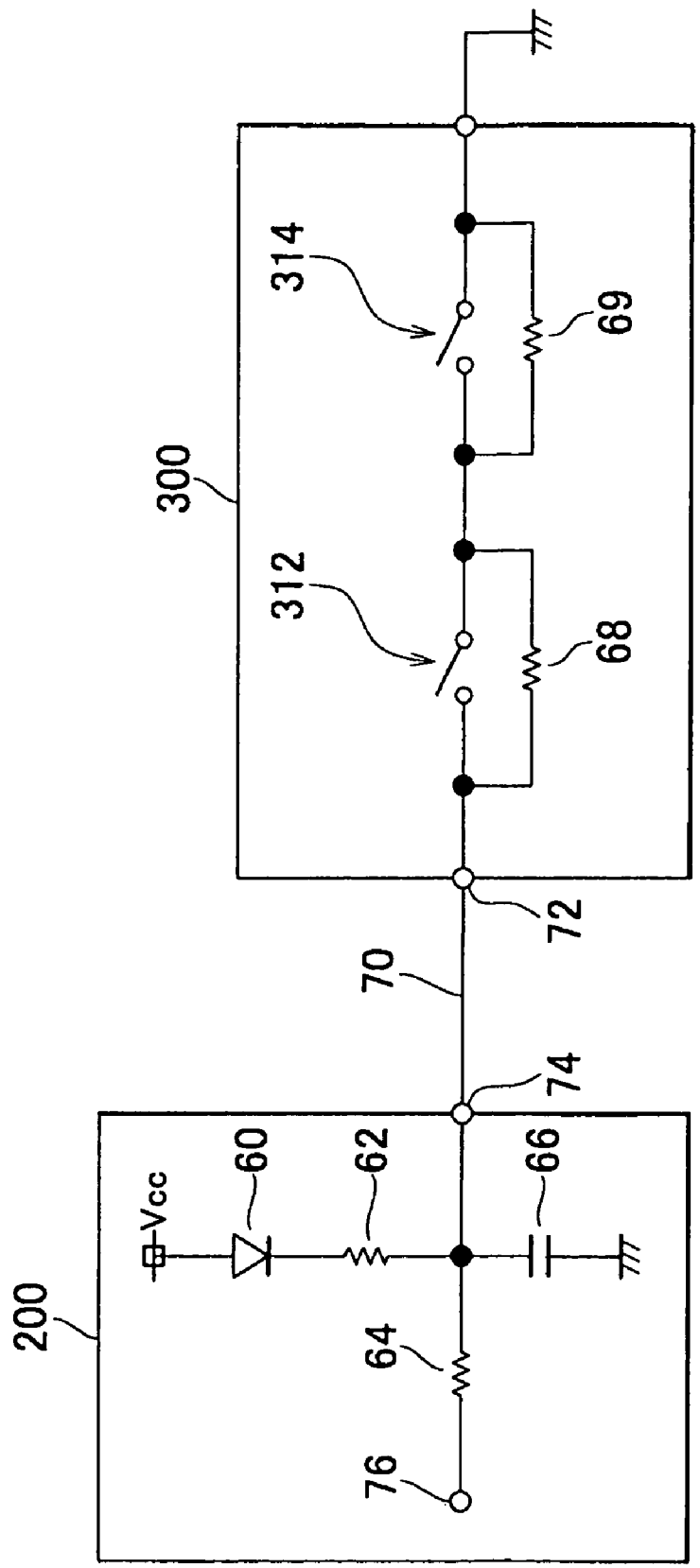
FIG. 7 is a diagram showing a circuit of the fluid level detecting apparatus shown in FIG. 6.

FIG. 7 is a diagram showing the circuit of the fluid level detecting apparatus 300 shown in FIG. 6. As shown in FIG. 7, in the fluid level detecting apparatus 300, the first reed switch 312 and the second reed switch 314 are connected in series. The other end of the second reed switch 314 is grounded, and the other end of the first reed switch 312 is connected to the output terminal 72. Also, the resistor 68 is connected in parallel to the first reed switch 312, and a resistor 69 is connected in parallel to the second reed switch 314. The circuit configuration of the ECU 200 is the same as that shown in FIG. 3.

The states of the first reed switch 312 and the second reed switch 314 shown in FIG. 7 are indicative of a case in which the level of fluid in the reservoir 26 is sufficiently higher than minimum fluid level MIN, such that both the first reed switch 312 and the second reed switch 314 are off. At this time, the voltage at the detecting terminal 76 of the ECU 200 is equal to the difference of the power supply voltage Vcc minus the offset voltage of the diode 60, divided by the resistance of the resistor 68 and the resistance of the resistor 69. At this time, the ECU 200 performs brake control in the normal control mode.

If the fluid level drops to the minimum fluid level MIN, the first reed switch 312 is switched from off to on. As a result, the voltage at the detecting terminal 76 becomes equal to the difference of the power supply voltage Vcc minus the offset voltage of the diode 60, divided by the resistance of the resistor 62 and the resistance of the resistor 69. At this time, the ECU 200 issues a warning to the driver by illuminating the warning lamp.

If the fluid level drops further to the failsafe mode operation fluid level FL, the second reed switch 314 is switched from off to on. As a result, the first switch 312 and the second reed switch 314 are both on so the detected terminal 76 is shorted to the ground potential. At this time, the ECU 200 switches the control mode to a control mode that is different from before, i.e., to the failsafe mode.

In this way, with the fluid level detecting apparatus 300 it is possible to detect two fluid levels, i.e., the minimum fluid level MIN and the maximum fluid level MAX, using a single float. As a result, the structure of the apparatus is simplified so the fluid level detecting apparatus can be made at low cost. Also, because there is only one float and the float chamber is unnecessary, the reservoir 26 can be made even smaller.

In the fluid level detecting apparatus 300 shown in FIG. 6, two reed switches, i.e., the first reed switch 312 and the second reed switch 314, are provided. Alternatively, however, the fluid level detecting apparatus 300 may be provided with only the first reed switch 312 at the height of the minimum fluid level MIN, and the ECU 200 may estimate that the fluid level has reached the failsafe mode operation fluid level FL when an accumulated operating time of the oil pump 34 equal to a first predetermined period of time has passed after it has been detected that the fluid level has reached the minimum fluid level MIN. In this case, the ECU 200 functions as estimating means of the failsafe mode operation fluid level FL. If there is a leak, the fluid level will drop as time passes so it is possible to detect that the fluid level has reached the failsafe mode operation fluid level FL by monitoring the time.

Also, the ECU 200 may count the number of brake operations after it has been detected that the fluid level has reached the minimum fluid level MIN, and estimate that the fluid level has reached the failsafe mode operation fluid level FL when the number of brake operations is equal to or greater than a first predetermined number. The reason why the fluid level can be estimated based on the number of brake operations is because the fluid level in the reservoir 26 drops further the more times the brake is operated.

Estimating the time after the fluid level has reached the minimum fluid level MIN or estimating the fluid level based on the number of brake operations in this way makes it possible to detect that the fluid level has reached the failsafe mode operation fluid level FL even when it is difficult to detect the actual fluid level due to vehicle vibrations or the like. Also, there is no need to provide means for mechanically detecting that the fluid level has reached the failsafe mode operation fluid level FL so the brake control system 10 can be made at low cost, and the reservoir 26 can be made smaller. The first predetermined period of time and the first predetermined number may be set appropriately through testing.

The ECU 200 may also issue a warning (hereinafter referred to as a "second warning") which is different from the warning (hereinafter referred to as a "first warning") that is issued when it has been detected that the fluid level has reached the minimum fluid level MIN, when it has been detected that the fluid level has reached a medium fluid level ML between the minimum fluid level MIN and the failsafe mode operation fluid level FL. The warning method is preferably changed such that the first warning is a visible warning such as the illumination of a lamp and the second warning is an audible warning such as a buzzer, for example. As a result, even if the lamp is difficult to see when it is bright inside the vehicle, the audible warning will be issued, so the warning is repetitive. Moreover, steps can be taken to increase the fluid level at the first warning, making it possible to inhibit a warning by a bothersome noise.

The ECU 200 may also estimate that the fluid level has reached the medium fluid level ML when the accumulated operating time of the oil pump 34 equal to a predetermined second period of time has passed after it has been detected that the fluid level has reached the minimum fluid level MIN. The second predetermined period of time is shorter than the first predetermined period of time described above. In this case, the ECU 200 functions as estimating means of the medium fluid level ML.

Also, the ECU 200 may count the number of brake operations after it has been detected that the fluid level has reached the minimum fluid level MIN, and estimate that the fluid level has reached the medium fluid level ML when the number of brake operations is equal to or greater than a second predetermined number. The second predetermined number is less than the first predetermined number described above.

According to these kinds of structures, the medium fluid level ML can be detected without increasing the number of floats, which simplifies the structure so that the brake control system 10 is less expensive to make, and enables the reservoir 26 to be smaller. The second predetermined period of time and the second predetermined number may be set appropriately through testing.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the claimed invention.

The invention claimed is:

1. A brake control apparatus comprising:
    a fluid level detecting portion that detects a level of fluid in a reservoir;
    a warning issuing portion that issues a first warning when the level of fluid detected by the fluid level detecting portion has reached a predetermined first fluid level; and
    a controlling portion that controls hydraulic control using a control mode, that differs from a control mode that has been performed, when it is detected by the fluid level detecting portion that the fluid level has reached a predetermined second fluid level that is lower than the first fluid level after the first warning has been issued by the warning issuing portion,
    wherein the fluid level detecting portion includes a fixed member that is fixed to the reservoir, a first float which moves up and down with respect to the fixed member according to the level of the fluid, and a second float which moves up and down with respect to the fixed member according to the level of the fluid,
    wherein the fluid level detecting portion detects that the fluid level has reached the first fluid level when the first float falls, so that the fixed member and the first float becomes a first predetermined positional relationship, and the fluid level detecting portion detects that the fluid level has reached the second fluid level when the second float falls, so that the fixed member and the second float becomes a second predetermined positional relationship.

2. The brake control apparatus according to claim 1, wherein the fixed member includes:
    a first switch that is switched from off to on when the first float becomes the first positional relationship; and
    a second switch that is switched from on to off when the second float becomes the second positional relationship.

3. The brake control apparatus according to claim 2, wherein in a circuit of the fluid level detecting portion: the first switch and the second switch are connected in series, one end of the first switch is connected to an output terminal of the fluid level detecting portion, and a resistor is connected in parallel with the first switch.

4. The brake control apparatus according to claim 1, wherein the first float and the second float are arranged on the same axis.

5. The brake control apparatus according to claim 1, wherein the second float is arranged in a normal control chamber of the reservoir.

6. The brake control apparatus according to claim 1, wherein the warning issuing portion issues the first warning after a third predetermined period of time has passed after it has been detected by the fluid level detecting portion that the fluid level has reached the first fluid level.

7. The brake control apparatus according to claim 1 further comprising a pump that discharges fluid out of the reservoir,
    wherein the hydraulic controlling portion performs hydraulic control using the control mode, that differs from the control mode that has been performed, when an accumulated operating time of the pump equal to or longer than a fourth predetermined period of time has passed after it has been detected by the fluid level detecting portion that the fluid level has reached the second fluid level.

8. The brake control apparatus according to claim 1, wherein the hydraulic controlling portion performs hydraulic control using the control mode, that differs from the control mode that has been performed, when the number of brake operations is equal to or greater than a third predetermined number after it has been detected by the fluid level detecting portion that the fluid level has reached the second fluid level.

9. The brake control apparatus according to claim 1, wherein:

the hydraulic controlling portion performs hydraulic control using a fail safe control mode when the fluid level has reached the predetermined second fluid level;

fluid of a master cylinder is supplied to a wheel cylinder of a front wheel according to a driver's depressing operation in the fail safe control mode; and a hydraulic pressure of a wheel cylinder of a rear wheel is controlled by controlling a current supplied to a pressure increase valve located between an accumulator and the wheel cylinder of the rear wheel and to a pressure decrease valve that decreases a pressure of the wheel cylinder of the rear wheel.

\* \* \* \* \*